US012637302B2

(12) United States Patent
Rietema

(10) Patent No.: US 12,637,302 B2
(45) Date of Patent: May 26, 2026

(54) PALLET ASSEMBLY AND METHOD OF USE

(71) Applicant: KAMPS PALLETS INC., Grand Rapids, MI (US)

(72) Inventor: Brad Rietema, Grand Rapids, MI (US)

(73) Assignee: Kamps Pallets Inc., Grand Rapids, MI (US)

( * ) Notice: Subject to any disclaimer, the term of this patent is extended or adjusted under 35 U.S.C. 154(b) by 41 days.

(21) Appl. No.: 18/774,372

(22) Filed: Jul. 16, 2024

(65) Prior Publication Data

US 2026/0021975 A1     Jan. 22, 2026

(51) Int. Cl.
| | |
|---|---|
| *B65G 47/44* | (2006.01) |
| *B65G 19/02* | (2006.01) |
| *B65G 19/30* | (2006.01) |
| *B65G 47/38* | (2006.01) |
| *B65G 57/03* | (2006.01) |
| *B65G 57/06* | (2006.01) |

(52) U.S. Cl.
CPC ............. *B65G 47/44* (2013.01); *B65G 19/02* (2013.01); *B65G 19/30* (2013.01); *B65G 47/38* (2013.01); *B65G 57/035* (2013.01); *B65G 57/06* (2013.01)

(58) Field of Classification Search
CPC ........ B65G 47/44; B65G 19/02; B65G 19/30; B65G 47/38; B65G 57/035; B65G 57/06
See application file for complete search history.

(56) References Cited

U.S. PATENT DOCUMENTS

| | | | | |
|---|---|---|---|---|
| 2,776,741 | A | | 1/1957 | Carrier, Jr. |
| 2,895,624 | A | * | 7/1959 | Oster, Jr. ................ B65G 57/18 |
| | | | | 414/789.5 |
| 3,007,585 | A | * | 11/1961 | Geisler .................. B65G 57/06 |
| | | | | 414/790 |
| 3,717,249 | A | * | 2/1973 | Faley ..................... B65H 31/24 |
| | | | | 209/555 |
| 3,912,254 | A | | 10/1975 | Woodruff |
| 5,096,369 | A | * | 3/1992 | Ouellette ............... B65G 60/00 |
| | | | | 414/796.4 |
| 5,190,162 | A | | 3/1993 | Hartlepp |
| 5,421,446 | A | * | 6/1995 | Koch ................... B65G 47/647 |
| | | | | 198/570 |

(Continued)

FOREIGN PATENT DOCUMENTS

| | | |
|---|---|---|
| DE | 2823055 A1 | 11/1979 |
| JP | H07185475 A | 7/1995 |

(Continued)

OTHER PUBLICATIONS

Notification of Transmittal of the International Search Report and the Written Opinion of the International Searching Authority for Counterpart PCT/US2025/037719, Dated Oct. 21, 2205, 9 Pages.

*Primary Examiner* — Mark A Deuble

(74) *Attorney, Agent, or Firm* — McGarry Bair PC

(57) ABSTRACT

A pallet assembly including an overhead conveyor system having a conveyor platform and a push rail, a loading assembly, a stacking assembly, and a release assembly. The loading assembly provides a pallet to the overhead conveyor system. The stacking assembly is located below the conveyor platform and includes a first chute, a first movable floor, and a first height adjustment mechanism. The release assembly, which is coupled to a portion of the conveyor platform, includes a portion selectively configured to release a pallet into a first chute.

20 Claims, 6 Drawing Sheets

(56) References Cited

U.S. PATENT DOCUMENTS

| | | | |
|---|---|---|---|
| 5,551,833 A * | 9/1996 | Marsh | B65G 57/06 |
| | | | 414/794.3 |
| 6,089,819 A * | 7/2000 | Barnes | B65G 57/00 |
| | | | 414/796.8 |
| 6,264,042 B1 | 7/2001 | Cossey, Jr. | |
| 6,688,459 B1 * | 2/2004 | Bonham | B65G 47/82 |
| | | | 209/916 |
| 7,765,668 B2 | 8/2010 | Townsend et al. | |
| 7,958,624 B2 | 6/2011 | Townsend et al. | |
| 8,881,360 B2 | 11/2014 | Townsend et al. | |
| 8,918,976 B2 | 12/2014 | Townsend et al. | |
| 9,592,989 B2 * | 3/2017 | Herrmann | B65H 31/3009 |
| 10,092,987 B2 | 10/2018 | Townsend et al. | |
| 10,099,869 B2 | 10/2018 | De Lama Arenales | |
| 10,358,300 B2 | 7/2019 | Rieu | |
| 10,824,904 B2 | 11/2020 | Souder et al. | |
| 11,507,771 B2 | 11/2022 | Souder et al. | |
| 11,772,131 B2 * | 10/2023 | Süss | B65G 47/46 |
| | | | 209/552 |
| 11,851,293 B2 | 12/2023 | Graston et al. | |
| 11,969,760 B1 | 4/2024 | De La Rosa | |
| 2003/0038179 A1 | 2/2003 | Tsikos | |
| 2009/0134221 A1 | 5/2009 | Zhu | |
| 2009/0169353 A1 | 7/2009 | Townsend et al. | |
| 2010/0082152 A1 | 4/2010 | Mishra | |
| 2016/0355349 A1 | 12/2016 | Chierego | |
| 2020/0238340 A1 * | 7/2020 | Bombaugh | B07C 3/08 |
| 2023/0114085 A1 | 4/2023 | Soomro et al. | |
| 2023/0161351 A1 | 5/2023 | Prasad et al. | |
| 2023/0196187 A1 | 6/2023 | Horowitz | |
| 2023/0211382 A1 | 7/2023 | Soomro et al. | |
| 2024/0242171 A1 | 7/2024 | Sasaki | |

FOREIGN PATENT DOCUMENTS

| | | | |
|---|---|---|---|
| JP | 2007289892 A | 11/2007 | |
| JP | 2009042193 A | 2/2009 | |
| JP | 7487767 B1 | 5/2024 | |
| KR | 102367128 B1 | 2/2022 | |

* cited by examiner

PALLET ASSEMBLY AND METHOD OF USE

TECHNICAL FIELD

The present subject matter relates generally to a pallet assembly, more specifically, a pallet assembly having an overhead conveyor system.

BACKGROUND

Pallets are used to move and ship materials or products. The wooden pallet is the most commonly used shipping pallet and can be made from a variety of woods, including oak or pine. Pallets can also be made of, for example, plastic, metal, paper, recycled materials, or combination thereof. Pallets provide an inexpensive and relatively durable platform to transport materials or products.

DETAILED DESCRIPTION

Figure 1:
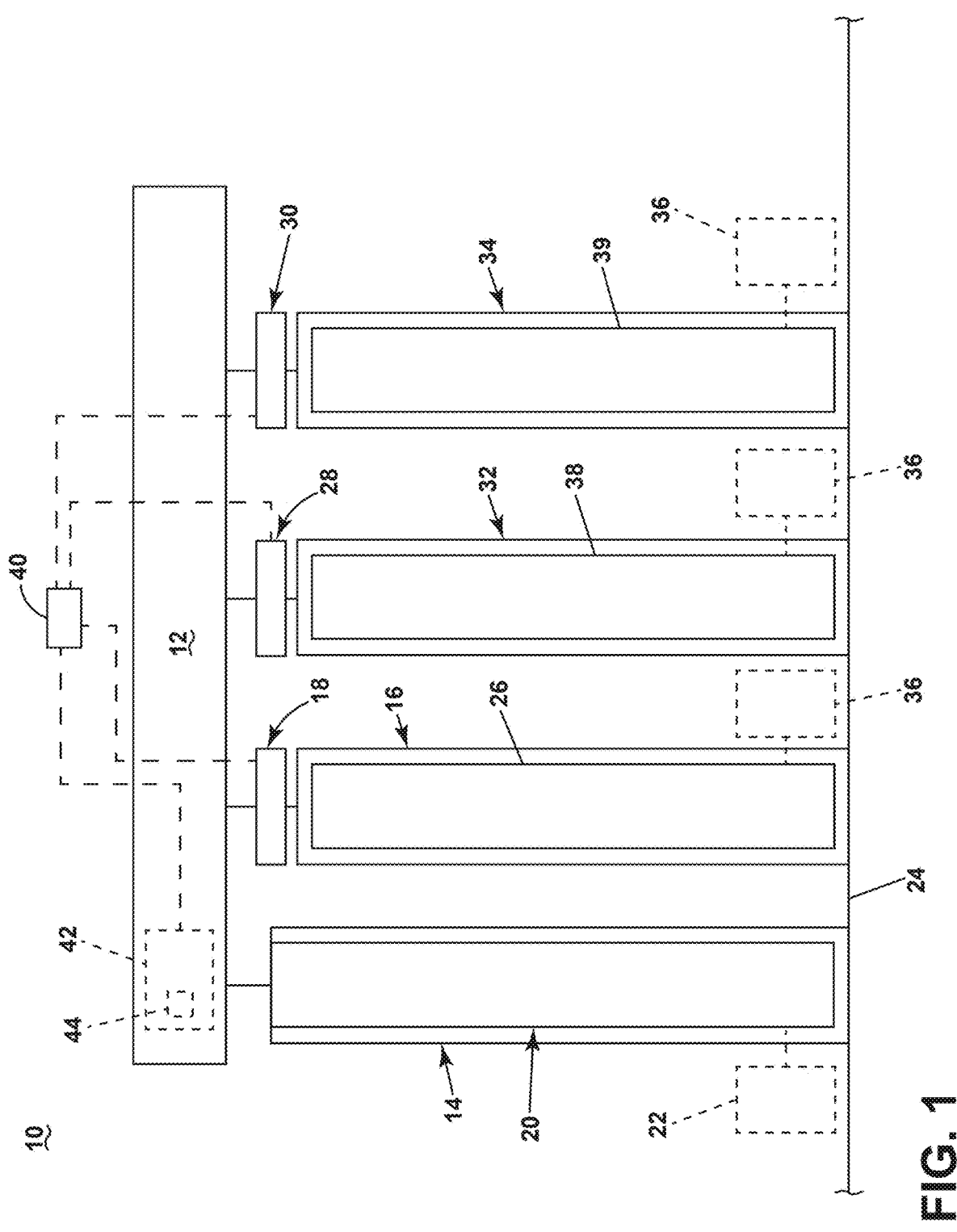
FIG. 1 is a schematic view of a pallet assembly in accordance with various aspects described herein.

Pallets are often reusable and can be repairable. Prior to initial use, before repair, before reuse or any combination thereof, pallets can be graded or sorted. A pallet can be graded or sorted based on one or more physical properties of the pallet such as by way of non-limiting example, cleanliness, integrity of the boards, position of the nails relative to the surface of the boards of the pallet, finishing applied, or any combination thereof. The pallet grade or sorting assignment can be one or more of a letter, a number, or a symbol indicating a classification that is met. The classifications are split up using predetermined physical property thresholds.

Aspects of the disclosure described herein are directed to a pallet assembly. Among other things the pallet assembly can receive a pallet and sort the pallet accordingly. The pallet is received at a loading assembly. The loading assembly includes a lifting mechanism or elevator that receives the pallet and lifts the pallet upward to an overhead conveyor system. The lifting mechanism or elevator can be powered by one or more motors or small engines. The overhead conveyer system uses a finger of a push rail to move the pallet from the loading assembly to a conveyor platform of the overhead conveyer system. A release assembly coupled to a portion of the conveyor platform can include movable or rotatable surfaces that define a portion of the conveyor platform when in a first position and provide an opening in the conveyor platform when in the second position. If opened, the release assembly provides a path for the pallet to enter a stacking assembly. The stacking assembly includes a movable floor with a height adjustment mechanism. When the movable floor receives a pallet, the height adjustment mechanism can lower the movable floor so that another pallet can be placed on top of the pallet previously received. In a non-limiting example, the pallet assembly includes multiple release assemblies that each correspond to one of multiple stacking assemblies. Thus, the multiple release mechanisms couple the conveyor platform to a corresponding stacking assembly, where each stacking assembly can receive multiple pallets due to the adjustment downward of the movable floor.

The initial sorting of the pallets can be based on one or more physical aspects and/or grade of the pallet. The grade of the pallet can be input manually or determined in any suitable manner such as via an optical system.

As may be used herein, the terms "first," "second," or "third" may be used interchangeably to distinguish one component from another and are not intended to signify location or importance of the individual components.

All directional references (e.g., upper, lower, left, right, front, back, top, bottom, above, below, vertical, horizontal, upstream, downstream, forward, aft, etc.) are only used for identification purposes to aid the reader's understanding of the present disclosure, and do not necessarily create limitations, particularly as to the position, orientation, or use of aspects of the disclosure described herein. Directional references in the figures are given with reference to a floor on which at least a portion of the pallet assembly rests.

Connection references (e.g., attached, coupled, and connected) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only. The dimensions, positions, order, and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Uses of "and" and "or" are to be construed broadly. For example, and without limitation, uses of "and" do not necessarily require all elements or features listed, and uses of "or" are inclusive unless such a construction would be illogical.

The term "parallel" refers to generally parallel, where first and second lines extend such that a third line can be drawn that crosses the first and second lines, wherein the third line is in a range of 80 degrees to 100 degrees to both the first line and the second line.

FIG. 1 schematically illustrates a pallet assembly 10 according to a non-limiting example. The pallet assembly 10 can include, among other things, an overhead conveyor system 12, a loading assembly 14 that can provide one or more pallets to the overhead conveyor system 12, a stacking assembly, illustrated by way of example as a first stacking assembly 16 located below the overhead conveyor system 12, and a release assembly, illustrated by way of example as a first release assembly 18, which is coupled to a portion of the overhead conveyor system 12. The first release assembly 18 is configured to selectively release a pallet from the overhead conveyor system 12 into the first stacking assembly 16. The first stacking assembly 16 includes a first movable floor 26. When the first release assembly 18 selectively releases the pallet, the first movable floor 26 is located such that the pallet is supported by the first movable floor 26.

The loading assembly 14 includes a lifting mechanism illustrated as an elevator 20, by way of non-limiting example. Optionally, a feeder 22 can provide one or more pallets to the elevator 20 which lifts the one or more pallets upward to the overhead conveyor system 12. In other words, the elevator 20 can receive a pallet from the feeder 22. In a non-limiting example, the feeder 22 is illustrated as a loading conveyer belt. The elevator 20 can lift the pallet from the feeder 22 to increase the distance between the pallet and a floor 24. While illustrated as spaced from the floor 24, it is contemplated that one or more portions of the feeder 22 can be proximate, adjacent, or in contact with the floor 24.

The overhead conveyor system 12 receives the one or more pallets from the elevator 20 of the loading assembly 14. The overhead conveyor system 12 can include supports that suspend the overhead conveyor system 12 from a ceiling, support the overhead conveyor system 12 from the floor 24, or any combination thereof.

Multiple release assemblies illustrated as the first release assembly 18, a second release assembly 28, and a third release assembly 30 can be included in the pallet assembly 10 by way of non-limiting example. The pallet assembly 10 can also include multiple stacking assemblies illustrated as the first stacking assembly 16, a second stacking assembly 32, and a third stacking assembly 34. While illustrated as three, any number of release assemblies and corresponding stacking assemblies are contemplated. Further still, while a corresponding number of release assemblies and stacking assemblies is illustrated this is by non-limiting example and need not be the case. However, for illustrative purposes it will be understood that the second release assembly 28 can be configured to selectively release a pallet from the overhead conveyor system 12 into the second stacking assembly 32 and the third release assembly 30 can selectively release a pallet from the overhead from the overhead conveyor system 12 into the third stacking assembly 34. The second stacking assembly 32 includes a second movable floor 38. When the second release assembly 28 selects to release the pallet, the pallet is supported by the second movable floor 38. The third stacking assembly 34 includes a third movable floor 39. When the third release assembly 30 selects to release the pallet, the pallet is supported by the third movable floor 39.

It is contemplated that each of the first stacking assembly 16, the second stacking assembly 32, the third stacking assembly 34, or any combination thereof can include an unloading mechanism 36. The unloading mechanism 36 can be in communication with the first stacking assembly 16, the second stacking assembly 32, the third stacking assembly 34, or any combination thereof such that when a number of pallets within the first stacking assembly 16, the second stacking assembly 32, the third stacking assembly 34, or any combination thereof reaches a predetermined threshold or a predetermined time the pallet(s) are removed from the corresponding assembly. The unloading mechanism 36 by way of non-limiting example can be another conveyor belt. Such a conveyor belt can be a number of distinct belts, a movable system between stacking assemblies, or any conveyor system capable of receiving a stack of pallets from one or more of the first stacking assembly 16, the second stacking assembly 32, or the third stacking assembly 34. The unloading mechanism 36 could alternatively be a robotic mechanism configured to remove the pallet(s) from the corresponding assembly.

A controller 40 is in communication with the first release assembly 18, the second release assembly 28, and the third release assembly 30. The controller 40 can determine which of the first release assembly 18, the second release assembly 28, or the third release assembly 30 is activated when a pallet is being conveyed through the pallet assembly 10. Input can be provided to the controller 40 by a user. Additionally, or alternatively, an inspection system 42 can be coupled to the controller 40 and the inspection system 42 can include at least one sensor 44 for determining at least one physical property of at least a portion of a pallet received by the loading assembly 14 or the overhead conveyor system 12.

While illustrated as having the sensor 44, any number of sensors can be coupled to the controller 40. The sensor 44 can be, by way of non-limiting example, one or more of a camera, a photo eye sensor, a limit switch, a dimensional sensor, a tunnel scanner equipped with multiple sensors, or a user having, for example, a push button actuated by the user. Optionally, the controller 40 or the inspection system 42 can include a processor or be in communication with a processor capable of deep learning. That is, the controller 40 or the inspection system 42 can include a neural network or artificial intelligence capable of receiving feedback from the sensor 44, the user, or a combination thereof to process data and sort or grade a pallet received by the loading assembly 14 or the overhead conveyor system 12. The sorting information or grade of the pallet can determine which of the first release assembly 18, the second release assembly 28, or the third release assembly 30 is activated.

Figure 2:
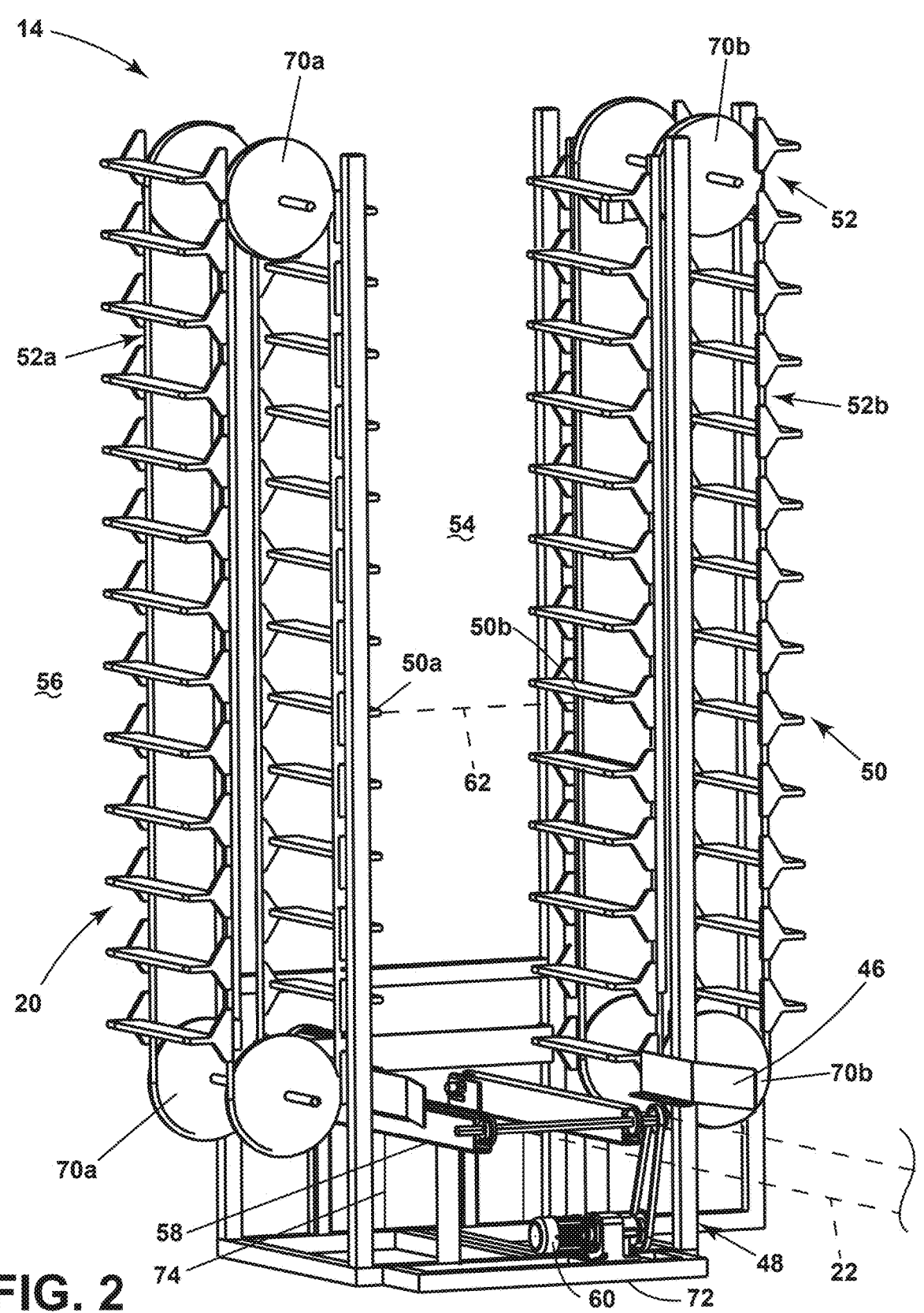
FIG. 2 is a perspective view of a loading assembly for use in the pallet assembly of FIG. 1 in accordance with various aspects described herein.

FIG. 2 depicts a perspective view of the loading assembly 14 that can be utilized in the pallet assembly by way of non-limiting example. The loading assembly 14 includes a support frame 48 and the elevator 20 illustrated, by way of example, as a plurality of slats 50 coupled to a vertical belt system 52. While described as a having a belt, the vertical belt system 52 can include, instead of a belt or in addition to a belt, a chain or other notched device capable of being driven including being driven by a wheel or a gear.

The support frame 48 defines an interior 54 of the loading assembly 14 and an exterior 56 of the loading assembly 14. It is contemplated that the support frame 48 can include additional beams or structures. It is further contemplated that the support frame 48 can include legs, adjustable legs, or other structural aspects.

Loading belts 58 located in the interior 54 of the loading assembly 14 can be driven by a first motor 60. Optionally, the feeder 22 can align or couple to the loading belts 58. It is contemplated that a pallet provided by the feeder 22 can be pulled into the interior 54 by the loading belts 58. Guide plates 46 can couple to the support frame 48. The guide plates 46 are located adjacent the loading belts 58 and can help align the pallet on the loading belts 58.

The plurality of slats 50 include at least one pair of slats including a first slat 50a and a second slat 50b located in the same horizontal plane. That is, a horizontal line, illustrated as dotted line 62, can be drawn between symmetric portions of the pair of slats including the first slat 50a and the second slat 50b. In other words, when a pallet is received at the interior 54 by the pair of slats including the first slat 50a and the second slat 50b, the pallet sits level on the pair of slates including the first slat 50a and the second slat 50b.

The vertical belt system 52 includes a first belt system 52a, a first set of gears or wheels 70a, a second belt system 52b, and a second set of gears or wheels 70b. The first belt system 52a moves a first slat 50a about the first set of gears or wheels 70a, which rotate in a counterclockwise direction, when looking from the front or the feed 22. When the first slat 50a is located in the interior 54, the first belt system 52a lifts or increases the distance the first slat 50a is from a base 72 of the support frame 48. When the first slat 50a rotates about a top portion of the first belt system 52a to the exterior 56, the first belt system 52a lowers or decreases the distance the first slat 50a is from the base 72 of the support frame 48. Similarly, the second belt system 52b moves a second slat 50b about gears or wheels 70b, which rotate in a clockwise direction, when looking from the front or the feed 22. When the second slat 50b is located in the interior 54, the second belt system 52b lifts or increases the distance the second slat 50b is from the base 72 of the support frame 48. When the second slat 50b rotates about a top portion of the second belt system 52b to the exterior 56, the second belt system 52b lowers or decreases the distance the second slat 50b is from the base 72 of the support frame 48.

A second motor 74 can drive both the first belt system 52a and the second belt system 52b. The second motor 74 is coupled to the first belt system 52a and the second belt system 52b such that the horizontal line, illustrated as the dotted line 62, will always connect the pair of slats including the first slat 50a and the second slat 50b.

The first motor 60 and the second motor 74 can be controlled or in communication with the controller 40 (FIG. 1). While illustrated as having the first motor 60 and the second motor 74, the loading assembly 14 can include any number of motors, including a single motor.

It is further contemplated that the elevator 20 is not limited by the example provided and can include any automated or manual means, such that, when a pallet is received by the elevator 20 at the interior 54 and lifted to the overhead conveyor system 12 (FIG. 1).

Figure 3:
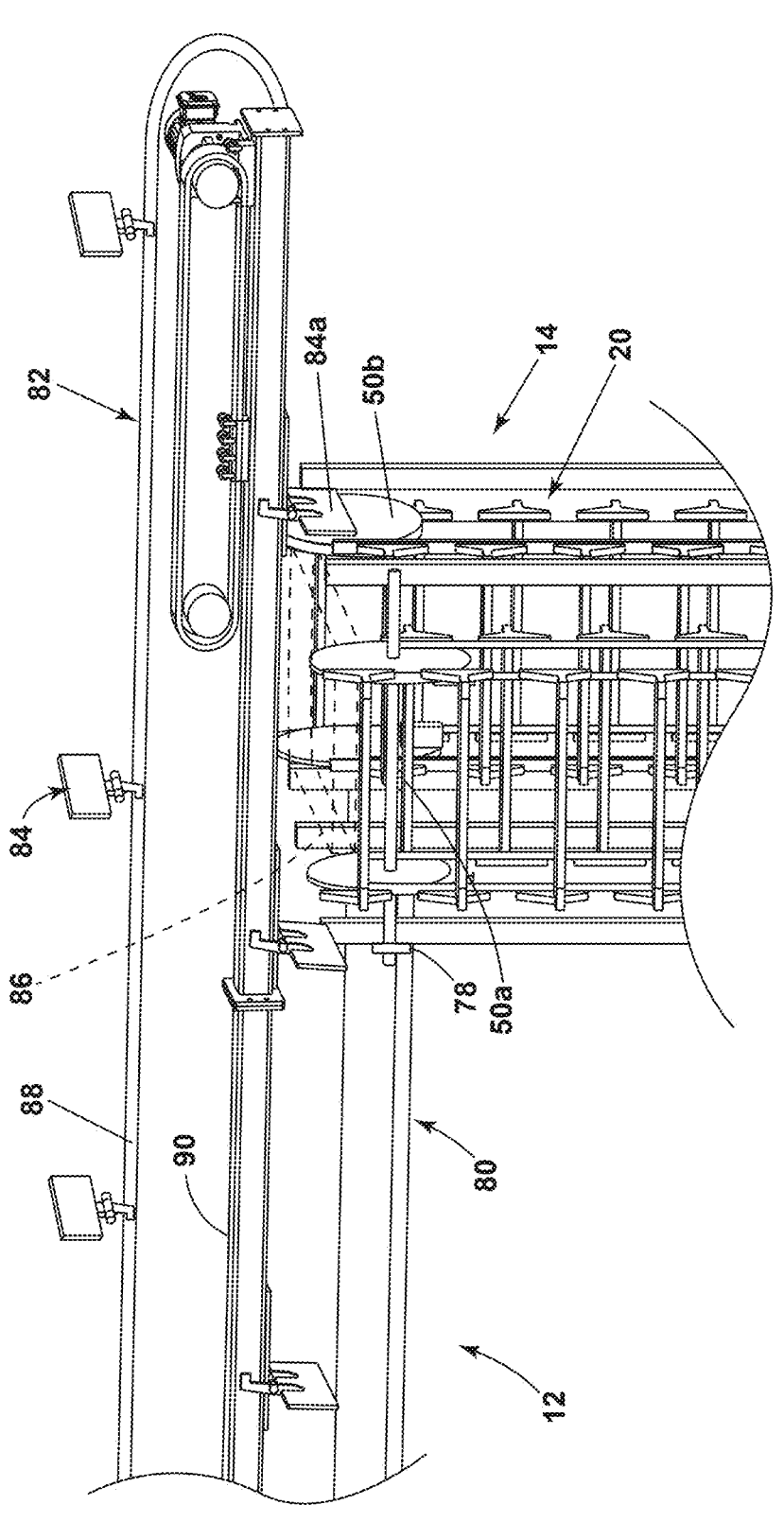
FIG. 3 is a perspective view of a portion of the loading assembly of FIG. 2 and a portion of an overhead conveyor system for use in the pallet assembly of FIG. 1 in accordance with various aspects described herein.

FIG. 3 depicts a portion of the loading assembly 14 and a portion of the overhead conveyor system 12 having a conveyor platform 80 and a push rail 82. The push rail 82 includes at least one finger illustrated, by way of example, as a plurality of fingers 84 configured to move a pallet 86, illustrated by a dotted box, from the loading assembly 14 to the conveyor platform 80. That is, a finger 84a of the plurality of fingers 84 can push the pallet 86 off the pair of slats including the first slat 50a and the second slat 50b to a leading edge 78 of the conveyor platform 80 when the elevator 20 positions the pallet 86 at the conveyor platform 80.

The plurality of fingers 84 can be coupled to a driving mechanism including by way of non-limiting example a belt system 88 rotatably driven about a support body 90, wherein each finger of the plurality of fingers 84 is configured to move a pallet from the loading assembly 14 to the overhead conveyor system 12. That is, multiple pallets can be sequentially or horizontally located on the conveyor platform 80, where each pallet of the multiple pallets is pushed horizontally by a finger of the plurality of fingers 84 from the loading assembly 14 to the conveyor platform 80. As illustrated, by way of example, the plurality of fingers 84 coupled to the belt system 88 rotate about the support body 90 in a clockwise direction.

Figure 4:
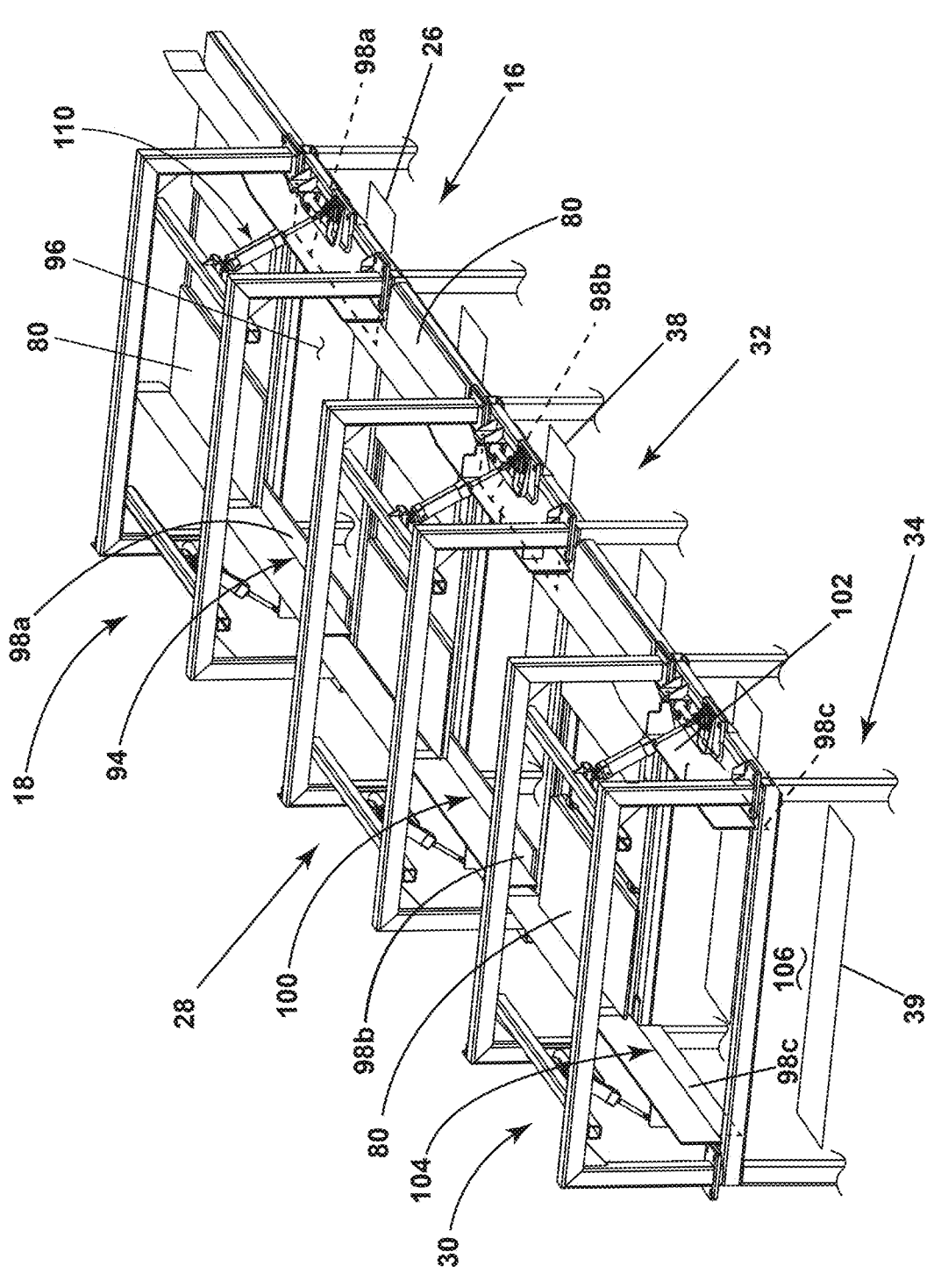
FIG. 4 is a perspective view of a portion of the overhead conveyor system and a portion of the release assembly for use in the pallet assembly of FIG. 1 in accordance with various aspects described herein.

FIG. 4 depicts a non-limiting example of the first release assembly 18, a portion of the conveyor platform 80, and a portion of the first stacking assembly 16. The first release assembly 18, the second release assembly 28, and the third release assembly 30 couple to horizontally spaced portions of the conveyor platform 80. The first release assembly 18 includes a first portion 94 that selectively releases a pallet into the first chute 96. The first portion 94 includes two surfaces 98a illustrated in a first position. When the two surfaces 98a are in the first position the two surfaces 98a define a portion of the conveyor platform 80 and are parallel to the floor 24 (FIG. 1). That is, when the two surfaces 98a are in the first position, the pallet passes over the first chute 96 on the two surfaces 98a and continues to the next portion of the conveyor platform 80. It is contemplated that the two surfaces 98a are rotatable between the first position and a second position. In the second position, the two surfaces 98a would allow the pallet to be released into the first chute 96.

The first movable floor 26 supports the pallet when the pallet is released by the two surfaces 98a in the second position into the first chute 96.

Similar to the first release assembly, the second release assembly 28 includes a second portion 100 that selectively releases the pallet into a second chute 102. The second portion 100 includes two surfaces 98b illustrated in the first position. When the two surfaces 98b are in the first position the two surfaces 98b define a portion of the conveyor platform 80. That is, when the two surfaces 98b of the second release assembly 28 are in the first position, the pallet passes over the second chute 102 on the two surfaces 98b and continues to the next portion of the conveyor platform 80. It is contemplated that the two surfaces 98b of the second release assembly 28 are rotatable between the first position and a second position. In the second position, the two surfaces 98b would allow the pallet to be released into the second chute 102. The second movable floor 38 supports the pallet in the second stacking assembly 32 when the pallet is released by the two surfaces 98b of the second release assembly 28 into the second chute 102.

The third release assembly 30 includes a third portion 104 that selectively releases the pallet into a third chute 106. The third portion 104 includes two surfaces 98c illustrated in the second position. When the two surfaces 98c are in the second position, the two surfaces 98c have rotated away from the conveyor platform 80 and the pallet can be received by the third chute 106. The third movable floor 39 of the third stacking assembly 34 receives the pallet when the two surfaces 98c of the third release assembly 30 are in the second position.

It is contemplated that the two surfaces 98c of the third release assembly 30 are rotatable between the first position and the second position. In the first position, the two surfaces 98c define a portion of the conveyor platform 80.

It is contemplated that the motion of the two surfaces 98a, 98b, 98c can be controlled in part by one or more pistons 110. That is, the one or more pistons 110, illustrated by way of example as two pistons for each release assembly, can dampen or drive motion of the two surfaces 98a, 98b, 98c between the first position and the second position. Optional, the controller 40 (FIG. 1) can drive or otherwise active the one or more pistons 110.

Figure 5:
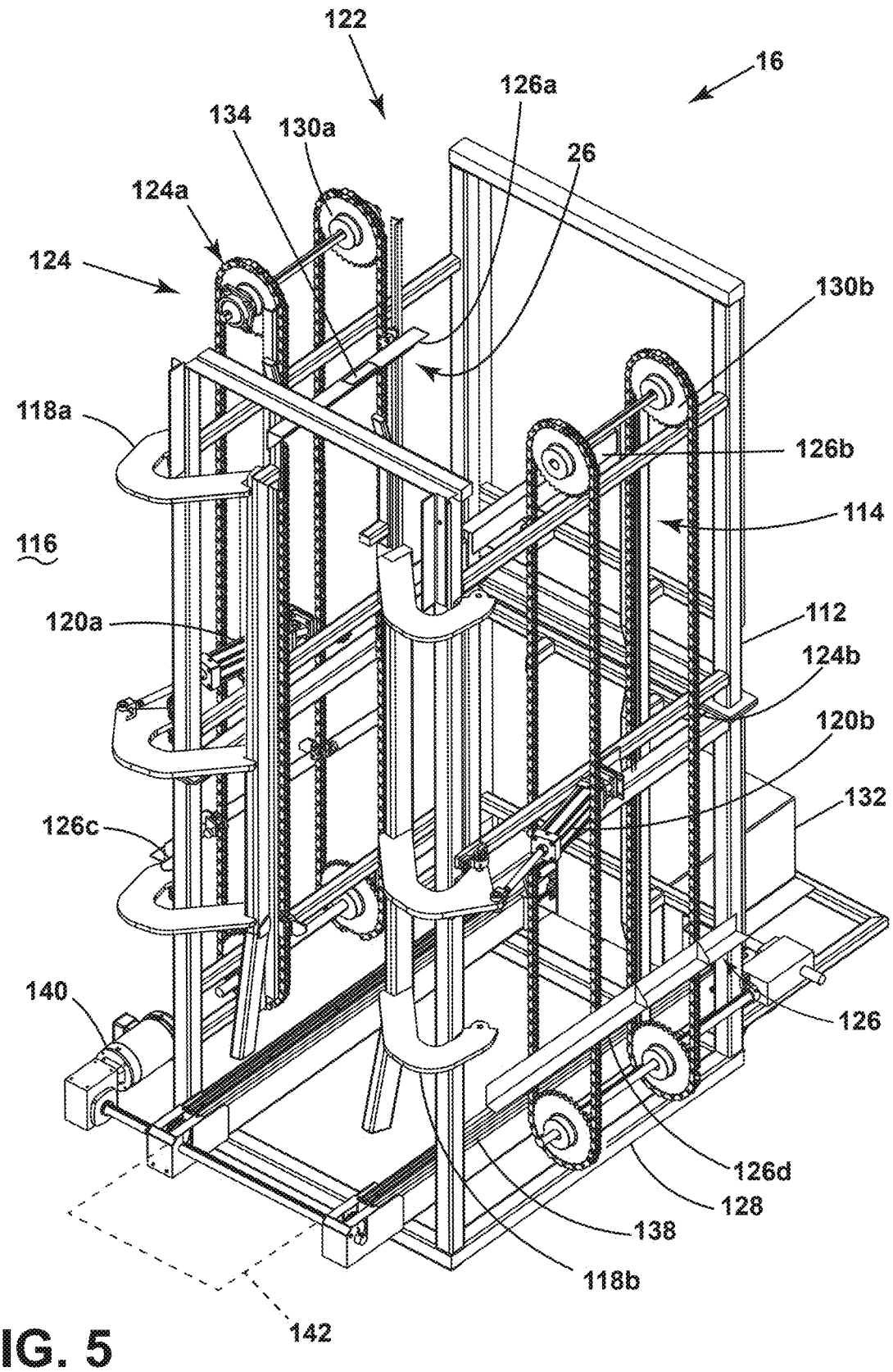
FIG. 5 is a perspective view of a stacking assembly for use in the pallet assembly of FIG. 1 in accordance with various aspects described herein.

FIG. 5 depicts an exemplary first stacking assembly 16 that can be utilized in the pallet assembly 10. A stacking support frame 112 defines an interior 114 of the first stacking assembly 16 and an exterior 116 of the first stacking assembly 16. It is contemplated that the stacking support frame 112 can include any number of additional beams, structures, or supports. It is further contemplated that the stacking support frame 112 can include legs, adjustable legs, or other structural aspects.

A gate, illustrated by way of example as having doors 118a, 118b, is movable from a closed position, as illustrated, to an open position. The doors 118a, 118b can be selectively coupled or rotatably coupled to the stacking support frame 112.

Pistons 120a, 120b can determine the position of the doors 118a, 118b. That is, the pistons 120a, 120b can expand or contract to move the doors 118a, 118b from the first position to the second position and vice versa.

The stacking support frame 112 includes an opening 122 that is aligned with, defines, or overlaps the first chute 96 (FIG. 4). A pallet selectively released by the first release assembly 18 (FIG. 4) can be received by the first stacking assembly 16 at the opening 122.

The first stacking assembly 16 includes the first movable floor 26 and a first height adjustment mechanism 124 operably coupled to the first movable floor 26. The movable floor 26 includes, by way of example, a plurality of platforms 126 illustrated by way of non-limiting example as four platforms including a first platform 126a, a second platform 126b, a third platform 126c, and a fourth platform 126d. The first platform 126a is paired with the second platform 126b. When the first platform 126a and the second platform 126b are located at the interior 114 they collectively define a first receiving surface of the first movable floor 26. The first platform 126a and the second platform 126b are configured to move together. That is the first platform 126a and the second platform 126b maintain the same vertical distance from a base 128 of the stacking support frame 112.

Similarly, the third platform 126c is paired with the fourth platform 126d. While illustrated at the exterior in FIG. 5 it will be understood that when the third platform 126c and the fourth platform 126d are rotated to the interior 114, the third platform 126c and the fourth platform 126d define a second receiving surface of the first movable floor 26. While illustrated as having four platforms it will be understood that the first stacking assembly 16 can include any suitable number of platforms.

A first adjustment assembly 124a, a first set of gears or wheels 130a, a second adjustment assembly 124b, and a second set of gears or wheels 130b can be included in the first height adjustment mechanism 124. The first adjustment assembly 124a moves the first platform 126a and the third platform 126c about the first set of gears or wheels 130a which intermittently rotate in a clockwise direction, when looking toward the interior 114 from the doors 118a, 118b. That is, when in the interior 114, the first platform 126a or the third platform 126c can be lowered or moved closer to the base 128 by the first adjustment assembly 124a.

The second adjustment assembly 124b moves the second platform 126b or the fourth platform 126d about the second set of gears or wheels 130b which intermittently rotate in a counterclockwise direction, when looking toward the interior 114 from the doors 118a, 118b. That is, then in the interior 114, the second platform 126b and the fourth platform 126d can be lowered or moved closer to the base 128 by the second adjustment assembly 124b.

A first motor 132 can selectively drive the first height adjustment mechanism 124. Additionally, or alternately, the motion of the first height adjustment mechanism 124 can be a result of weight, such as one or more pallets, added to the first receiving surface or the second receiving surface.

A sensor 134 can be coupled to the first stacking assembly 16 and in communication with the first height adjustment mechanism 124. An output from the sensor 134 can be used to adjust a vertical height of the first movable floor 26. The vertical height can be measured from the base 128 to a bottom or lower portion of the four platforms 126a, 126b, 126c, 126d. The sensor 134 can provide an output indicative of a number of pallets being supported by the first movable floor 26. The sensor 134 can be in communication the controller 40 (FIG. 1) or another controller, such that the vertical height of the first movable floor 26 is adjusted by the first height adjustment mechanism 124 automatically based on the output of the sensor 134.

The sensor 134 can be one or more of a force sensor, strain sensor, optical sensor, or dimensional sensor. While illustrated as a single sensor, the sensor 134 can be a plurality of sensors located at or adjacent the first stacking assembly 16.

An evacuation belt is illustrated by belts 138 located at least partially in the interior 114 of the first stacking assembly 16. The belts 138 can be driven by a second motor 140. Optionally, an exit conveyor 142 can align or couple to the first stacking assembly 16 at or adjacent the belts 138. That is, it is contemplated that a stack or plurality of pallets provided by the first stacking assembly 16 can be moved out of the interior 114 by the belts 138 to the exit conveyor 142 or another machine capable of receiving a stack of pallets. In other words, the belts 138 can move one or more pallets from first stacking assembly 16 to the exit conveyor 142 when the doors 118a, 118b to the gate are in the open position.

While illustrated as the four platforms 126a, 126b, 126c, 126d coupled to chains rotatable by gears, it is contemplated that the first height adjustment mechanism 124 can be any combination of gears, wheels, belts, or any other device that can receive a plurality of pallets and lower the plurality of pallets towards the base 128. By way of non-limiting example, the first height adjustment mechanism 124 can include a hydraulic lift.

The first stacking assembly 16 is illustrated by way of example and can includes the same or similar elements as the second stacking assembly 32 (FIG. 4) having the second movable floor 38 (FIG. 4) and a second height adjustment mechanism Further the third stacking assembly 34 (FIG. 4) having the third movable floor 39 (FIG. 4) can include a third height adjustment mechanism similar to or different than the first height adjustment mechanism 124.

Referring to FIGS. 1-5, in operation, pallets are supplied to the loading assembly 14 of the pallet assembly 10. The pallets can be placed sequentially on the feeder 22 which can manually or automatically move the pallets horizontally to the loading assembly 14. The pallets are pulled one at a time from the feeder 22 into the interior 54 of the loading assembly 14 by the loading belts 58 driven by the first motor 60. The first motor 60 can continuously drive the loading belts 58 or be activated to intermittently drive the loading belts 58. Alternatively, one pallet at a time can be provided to the loading belts 58 by a machine or user.

The guide plates 46 can align the pallet that enters the loading assembly 14, to ensure it is positioned to be lifted. A pair of slats, for example the pair of slats including the first slat 50a and the second slat 50b, lift the pallet to the leading edge 78 of the conveyor platform 80 of the overhead conveyor system 12. Each pair of slats can lift a single pallet, therefore the loading assembly 14, having the plurality of slats 50, can lift multiple pallets at the same time, where each pallet has a corresponding pair of slats and is a different vertical height from the base 72 of the support frame 48.

The lifting of the plurality of slats 50 can be done by the vertical belt system 52 selectively or continuously driven by the second motor 74. In other words, the multiple pairs of slats of the plurality of slats 50 lift upward two or more pallets spaced vertically to be received sequentially by the overhead conveyor system 12. It is contemplated that any number of sensors or communication between speed of the vertical belt system 52, the feed 22, or other aspects of the loader can be controlled by one or more controller, such as, for example, the controller 40.

A finger, illustrated as the finger 84a, can move the pallet at the leading edge 78 off the pair of slats, for example the first slat 50a and the second slat 50b, and onto the conveyor platform 80. Prior to loading, during loading, during lifting, or during the movement of the pallet along the conveyor, sorting information assigned or a grade is given to the pallet. The sorting information or the grade can be input by a user or determined by an inspection system 42. The sorting information or the grade is communicated to the controller 40 which determines, based on the sorting information or the grade, which release assembly, illustrated as the first release assembly 18, the second release assembly 28, or the third release assembly 30, is to be activated.

By way of non-limiting example, if the pallet were given a grade of "A" and "A" pallets were to accumulate in the first stacking assembly 16, then the controller 40 would move the first portion 94 or the two surfaces 98a of the first release assembly 18 into the open or second position at a time corresponding to the arrival of the pallet at the first release assembly 18. Opening or moving the first portion 94 or the two surfaces 98a to the second position releases the pallet into the first chute 96. The pallet does not have far to move, as the first movable floor 26 receives the pallet from the first chute 96. The detection of the pallet being added to the first stacking assembly 16 can be done by the sensor 134, manual entry by a user, or the compressive force of the pallet.

Once the pallet is received by the first movable floor 26, the vertical height of the first movable floor 26 can be adjusted by the first height adjustment mechanism 124, so that when another pallet with a grade of "A," is provided to the conveyor platform 80, there is room for it to be stacked on top of the received pallet within the first stacking assembly 16. The first height adjustment mechanism 124 can be automatic based on the output of the sensor 134, manually activated/adjusted, or move in response to the gravitational force from the pallet.

Once the first stacking assembly 16 has reached a predetermined number of pallets, or if the cycle of operation of the pallet assembly 10 is complete, the doors 118a, 118b of the first stacking assembly 16 can be moved to an open position automatically or manually. The stack or set of grade "A" pallets can be moved from the interior 114 of the first stacking assembly 16 to the exterior 116. A machine or exit conveyor 142 can receive the stack of pallets from the first stacking assembly 16.

Figure 6:
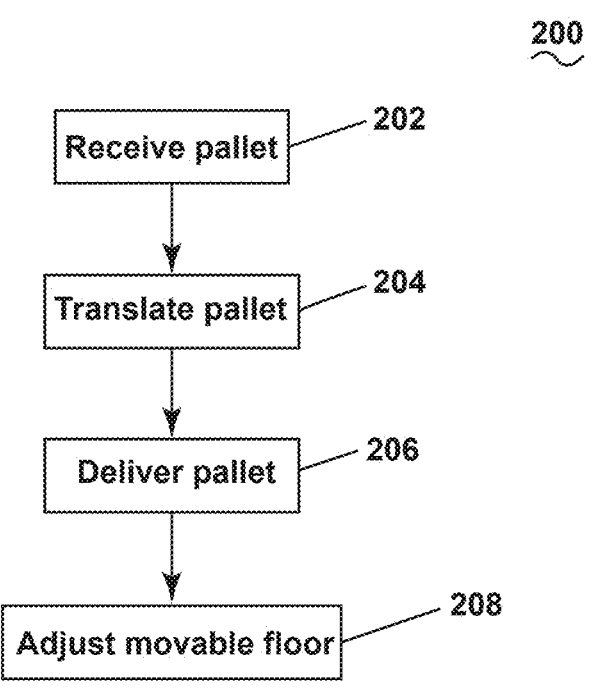
FIG. 6 is a flow chart diagram illustrating a method for use of the pallet assembly of FIG. 1 in accordance with various aspects described herein.

FIG. 6 illustrates a method 200 of selectively sorting a plurality of pallets using the pallet assembly 10. At 202 at least one pallet of the plurality of pallets is received at the leading edge 78 the overhead conveyor system 12.

At 204, the finger 84a of the push rail 82 translates the at least one pallet onto the conveyor platform 80.

At 206, the pallet is delivered via the corresponding release assembly to a predetermined stacking assembly. That is, the stacking assembly which will receive the pallet is determined by one or more aspects corresponding to sorting information or grade. In other words, the controller 40, based on sorting information, grade, or other aspect of the pallet, determines which of the multiple stacking assemblies should receive the pallet.

For example, if the pallet's grade corresponded to the third staking assembly 34, then the controller 40 would move the two surface 98c of the third releasing assembly 30 into the second position, allowing the pallet to enter the third chute 106 and be received by the third stacking assembly 34. The pallet, within the third stacking assembly 34 is supported by the third movable floor 39.

Optionally, the sorting information or the grade of the pallet can be determined by the inspection system 42. The inspection system 42 can include one or more cameras or dimensions sensors. The output of the one or more cameras or dimensions sensors can then be used by the controller 40 to determine the stacking assembly (e.g. first stacking assembly 16, second stacking assembly 32, third stacking assembly 34 that will receive the pallet.

At 208, the vertical height of the movable floor is adjusted based on the delivery of the pallet. Continuing with the non-limited example, the third movable floor 39, upon supporting a pallet (or an additional pallet) is moved down by the third height adjustment mechanism. That is, the adjusting of the vertical height of the movable floor 39 upon delivery of the pallet includes a lowering of the third movable floor 39 by the third height adjustment mechanism.

Benefits of aspects of the disclosure include faster sorting of a plurality of pallets. It is also contemplated that, using the inspection system, can improve the accuracy with which the plurality of pallets are sorted.

Further aspects are provided by the subject matter of the following clauses:

A pallet assembly comprising an overhead conveyor system having a conveyor platform and a push rail, a loading assembly configured to provide a pallet to the overhead conveyor system, a stacking assembly located below the conveyor platform, wherein the stacking assembly includes a first chute, a first movable floor, and a first height adjustment mechanism operably coupled to the first movable floor, and a release assembly coupled to a portion of the conveyor platform, wherein the release assembly includes a portion selectively configured to release a pallet into the first chute.

The pallet assembly of any preceding clause, wherein the stacking assembly comprises a sensor in communication with the first height adjustment mechanism, wherein an output from the sensor is used to adjust a vertical height of the first movable floor.

The pallet assembly of any preceding clause, wherein the vertical height of the first movable floor is automatically adjusted by the first height adjustment mechanism based on the output of the sensor.

The pallet assembly of any preceding clause, wherein the stacking assembly further comprises a gate movable between an open position and a closed position.

The pallet assembly of any preceding clause, wherein the stacking assembly further comprises an evacuation belt configured to move one or more pallets from stacking assembly to a conveyor when the gate is in the open position.

The pallet assembly of any preceding clause, wherein the loading assembly comprises an elevator that receives a pallet from a feed.

The pallet assembly of any preceding clause, wherein the elevator comprises a pair of slats coupled to a vertical belt system that determines a vertical distance between the pair of slats and a base.

The pallet assembly of any preceding clause, wherein the pair of slats are multiple pairs of slats that lift upward two or more pallets stacked vertically to be received sequentially by the overhead conveyor system.

The pallet assembly of any preceding clause, wherein the push rail comprises a finger configured to move the pallet from the loading assembly to the conveyor platform when the elevator positions the pallet at the conveyor platform.

The pallet assembly of any preceding clause, wherein the push rail comprises a plurality of fingers coupled to a belt system rotatably driven about a support body, wherein each finger of the plurality of fingers is configured to move a pallet from the loading assembly to the conveyor platform.

The pallet assembly of any preceding clause, wherein the portion of the release assembly includes two surfaces rotatable between a first position and a second position, wherein the two surfaces in the first position are configured to define a portion of the conveyor platform and the two surfaces in the second position are configured to release the pallet to the first chute.

The pallet assembly of any preceding clause, wherein motion of the two surfaces is controlled in part by pistons.

The pallet assembly of any preceding clause, wherein the stacking assembly is a first stacking assembly and the pallet assembly further comprises a second stacking assembly comprising a second chute, a second movable floor, and a second height adjustment mechanism operably coupled to the second movable floor.

The pallet assembly of any preceding clause, wherein the release assembly is a first release assembly and the pallet assembly further comprises a second release assembly, wherein the first release assembly includes a first portion selectively configured to release the pallet to the first chute and the second release assembly includes a second portion selectively configured to release the pallet to a second chute assembly.

The pallet assembly of any preceding clause, further comprising an inspection system mounted to the overhead conveyor system, the loading assembly, or combination of thereof, wherein the inspection system comprises a camera, a photo eye sensor, a limit switch, a dimensional sensor, a tunnel scanner equipped with multiple sensors, or a user having a push button actuated by the user.

The pallet assembly of any preceding clause, wherein movement of at least one of the first portion of the first release assembly or the second portion of the second release assembly is based on output from the inspection system.

The pallet assembly of any preceding clause, further comprising an inspection system mounted to the overhead conveyor system, the loading assembly, or combination of thereof, wherein the inspection system comprises a camera, a photo eye sensor, a limit switch, a dimensional sensor, a tunnel scanner equipped with multiple sensors, or a user having a push button actuated by the user.

The pallet assembly of any preceding clause, wherein the first movable floor includes at least one pair of platforms and the first height adjustment mechanism includes a belt coupled to the at least one pair of platforms.

The pallet assembly of any preceding clause, wherein the stacking assembly includes a frame that defines an interior and an exterior of the stacking assembly, and wherein the belt is configured to lower the at least one pair of platforms downward when in the interior, and upward when the at least one pair of platforms are located exterior of the frame.

The pallet assembly of any preceding clause, wherein the stacking assembly further comprises a gate movable between a closed position and an open position, and an evacuation belt configured to move one or more pallets from stacking assembly to a conveyor when the gate is in the open position.

A method of selectively sorting a plurality of pallets using the pallet assembly of claim 1, the method comprising: receiving, at a leading edge of the overhead conveyor system, at least one pallet of the plurality of pallets; translating the at least one pallet onto the conveyor platform via a finger of the push rail; delivering the pallet via the corresponding release assembly to a predetermined staking assembly; and adjusting a vertical height of the first movable floor upon delivering the pallet.

The method of any preceding clause, wherein the delivering of the pallet further includes an inspection system having a camera, a photo eye sensor, a limit switch, a dimensional sensor, a tunnel scanner equipped with multiple sensors, or a user having a push button actuated by the user, wherein an output of the inspection system determines the stacking assembly that will receive the pallet.

The method of any preceding clause, wherein the adjusting the vertical height of the movable floor includes a lowering of the movable floor by the height adjustment mechanism.

To the extent not already described, the different features and structures of the various embodiments can be used in combination, or in substitution with each other as desired. That one feature is not illustrated in all of the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A pallet assembly comprising:
an overhead conveyor system having a conveyor platform and a push rail;
a loading assembly configured to provide a pallet to the overhead conveyor system;
a stacking assembly located below the conveyor platform, wherein the stacking assembly includes a first chute, a first movable floor, and a first height adjustment mechanism operably coupled to the first movable floor; and
a release assembly coupled to a portion of the conveyor platform, wherein the release assembly includes a portion selectively configured to release a pallet into the first chute.

2. The pallet assembly of claim 1, wherein the stacking assembly comprises a sensor in communication with the first height adjustment mechanism, wherein an output from the sensor is used to adjust a vertical height of the first movable floor.

3. The pallet assembly of claim 2, wherein the vertical height of the first movable floor is automatically adjusted by the first height adjustment mechanism based on the output of the sensor.

4. The pallet assembly of claim 1, wherein the stacking assembly further comprises a gate movable between an open position and a closed position.

5. The pallet assembly of claim 4, wherein the stacking assembly further comprises an evacuation belt configured to move one or more pallets from the stacking assembly to a conveyor when the gate is in the open position.

6. The pallet assembly of claim 1, wherein the loading assembly comprises an elevator that receives a pallet from a feed.

7. The pallet assembly of claim 6, wherein the elevator comprises a pair of slats coupled to a vertical belt system that determines a vertical distance between the pair of slats and a base.

8. The pallet assembly of claim 7, wherein the pair of slats comprises multiple pairs of slats that lift upward two or more pallets stacked vertically to be received sequentially by the overhead conveyor system.

9. The pallet assembly of claim 6, wherein the push rail comprises a finger configured to move the pallet from the loading assembly to the conveyor platform when the elevator positions the pallet at the conveyor platform.

10. The pallet assembly of claim 1, wherein the push rail comprises a plurality of fingers coupled to a belt system rotatably driven about a support body, wherein each finger of the plurality of fingers is configured to move a pallet from the loading assembly to the conveyor platform.

11. The pallet assembly of claim 1, wherein the portion of the release assembly includes two surfaces rotatable between a first position and a second position, wherein the two surfaces in the first position are configured to define a portion of the conveyor platform and the two surfaces in the second position are configured to release the pallet to the first chute.

12. The pallet assembly of claim 11, wherein motion of the two surfaces is controlled in part by pistons.

13. The pallet assembly of claim 1, wherein the stacking assembly is a first stacking assembly and the pallet assembly further comprises a second stacking assembly comprising a second chute, a second movable floor, and a second height adjustment mechanism operably coupled to the second movable floor.

14. The pallet assembly of claim 13, wherein the release assembly is a first release assembly and the pallet assembly further comprises a second release assembly, wherein the first release assembly includes a first portion selectively configured to release the pallet to the first chute and the second release assembly includes a second portion selectively configured to release the pallet to the second chute assembly.

15. The pallet assembly of claim 14, further comprising an inspection system mounted to the overhead conveyor system, the loading assembly, or a combination thereof, wherein the inspection system comprises a camera, a photo eye sensor, a limit switch, a dimensional sensor, a tunnel scanner equipped with multiple sensors, or a user having a push button actuated by the user.

16. The pallet assembly of claim 15, wherein movement of at least one of the first portion of the first release assembly or the second portion of the second release assembly is based on output from the inspection system.

17. The pallet assembly of claim 1, further comprising an inspection system mounted to the overhead conveyor system, the loading assembly, or combination of thereof, wherein the inspection system comprises a camera, a photo eye sensor, a limit switch, a dimensional sensor, a tunnel scanner equipped with multiple sensors, or a user having a push button actuated by the user.

18. The pallet assembly of claim 1, wherein the first movable floor includes at least one pair of platforms and the first height adjustment mechanism includes a belt coupled to the at least one pair of platforms.

19. The pallet assembly of claim 18, wherein the stacking assembly includes a frame that defines an interior and an exterior of the stacking assembly, and wherein the belt is configured to lower the at least one pair of platforms downward when in the interior, and upward when the at least one pair of platforms are located exterior of the frame.

20. The pallet assembly of claim 19, wherein the stacking assembly further comprises a gate movable between a closed position and an open position, and an evacuation belt configured to move one or more pallets from the stacking assembly to a conveyor when the gate is in the open position.

* * * * *